US011535915B2

(12) United States Patent
Nishimoto et al.

(10) Patent No.: US 11,535,915 B2
(45) Date of Patent: Dec. 27, 2022

(54) STAINLESS STEEL MATERIAL, CONSTITUTING COMPONENT, CELL, AND FUEL CELL STACK

(71) Applicant: NIPPON STEEL STAINLESS STEEL CORPORATION, Tokyo (JP)

(72) Inventors: Takumi Nishimoto, Tokyo (JP); Yoshio Tarutani, Tokyo (JP)

(73) Assignee: NIPPON STEEL STAINLESS STEEL CORPORATION, Tokyo (JP)

( * ) Notice: Subject to any disclaimer, the term of this patent is extended or adjusted under 35 U.S.C. 154(b) by 110 days.

(21) Appl. No.: 16/498,091

(22) PCT Filed: Mar. 27, 2018

(86) PCT No.: PCT/JP2018/012485
§ 371 (c)(1),
(2) Date: Sep. 26, 2019

(87) PCT Pub. No.: WO2018/181348
PCT Pub. Date: Oct. 4, 2018

(65) Prior Publication Data
US 2021/0115543 A1  Apr. 22, 2021

(30) Foreign Application Priority Data

Mar. 27, 2017 (JP) ............................ JP2017-061605

(51) Int. Cl.
| | | |
|---|---|---|
| *C22C 38/02* | (2006.01) | |
| *C22C 38/04* | (2006.01) | |
| *C22C 38/06* | (2006.01) | |
| *H01M 8/021* | (2016.01) | |
| *H01M 8/0228* | (2016.01) | |
| *H01M 8/12* | (2016.01) | |
| *C22C 38/54* | (2006.01) | |
| *C21D 6/00* | (2006.01) | |
| *C21D 8/02* | (2006.01) | |
| *C21D 9/46* | (2006.01) | |
| *C22C 38/00* | (2006.01) | |
| *C22C 38/42* | (2006.01) | |
| *C22C 38/44* | (2006.01) | |
| *C22C 38/46* | (2006.01) | |
| *C22C 38/48* | (2006.01) | |

(Continued)

(52) U.S. Cl.
CPC .............. *C22C 38/54* (2013.01); *C21D 6/004* (2013.01); *C21D 6/005* (2013.01); *C21D 6/007* (2013.01); *C21D 6/008* (2013.01); *C21D 8/0226* (2013.01); *C21D 9/46* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *H01M 8/021* (2013.01); *H01M 8/0228* (2013.01); *H01M 8/12* (2013.01); *H01M 2008/1293* (2013.01)

(58) Field of Classification Search
CPC ......... C22C 38/02; C22C 38/04; C22C 38/06; H01M 8/021; H01M 8/0228; H01M 8/12; H01M 2008/1293
USPC ........................................................ 428/627
See application file for complete search history.

(56) References Cited

U.S. PATENT DOCUMENTS

| | | |
|---|---|---|
| 6,379,476 B1 | 4/2002 | Tarutani et al. |
| 2003/0116536 A1 | 6/2003 | Ohtani et al. |

(Continued)

FOREIGN PATENT DOCUMENTS

| | | |
|---|---|---|
| CN | 1271027 A | 10/2000 |
| JP | 6-264193 A | 9/1994 |

(Continued)

OTHER PUBLICATIONS

International Preliminary Report on Patentability and Written Opinion of the International Searching Authority(Forms PCT/IB/326, PCT/IB/373 and PCT/ISA/237), dated Oct. 10, 2019, for International Application No. PCT/JP2018/012485, with an English Transiation.

International Search Report, dated Jun. 19, 2018, for International Application No. PCT/JP2018/012485, with an English translation.

Cooper et al., "The effect of surface treatment on the oxidation of ferritic stainless steels used for solid oxide fuel cell interconnects," Journal of Power Sources, vol. 184, No. 1, Sep. 15, 2008, pp. 220-228, XP023439698.

(Continued)

*Primary Examiner* — Humera N. Sheikh
*Assistant Examiner* — Katherine A Christy
(74) *Attorney, Agent, or Firm* — Birch, Stewart, Kolasch & Birch, LLP

(57) ABSTRACT

A stainless steel material including a base material made of ferritic stainless steel, a Cr oxide layer formed on a surface of the base material, and a spinel oxide layer formed on a surface of the Cr oxide layer, wherein a chemical composition of the base material satisfies [16.0≤Cr+3×Mo−2.5×B−17×C−3−Si≤35.0], a thickness of the Cr oxide layer ($T_{Cr}$) and a thickness of the spinel oxide layer ($T_S$) satisfy [0.55≤$T_{Cr}$/$T_S$≤6.7], the base material contains precipitate including one or more kinds selected from a $M_{23}C_6$, a $M_2B$, a complex precipitate in which $M_2B$ acts as a precipitation nucleus, and $M_{23}C_6$ precipitates on a surface of the $M_2B$, and a complex precipitate in which NbC acts as a precipitation nucleus, and $M_{23}C_6$ precipitates on a surface of the NbC, and a part of the precipitate protrude from the surface of the Cr oxide layer.

7 Claims, No Drawings

(51) Int. Cl.
    *C22C 38/50*     (2006.01)
    *C22C 38/52*     (2006.01)

(56) References Cited

U.S. PATENT DOCUMENTS

| | | |
|---|---|---|
| 2003/0124406 A1 | 7/2003 | Ohtani et al. |
| 2014/0038064 A1 | 2/2014 | Yasuda et al. |
| 2017/0298488 A1 | 10/2017 | Tarutani et al. |

FOREIGN PATENT DOCUMENTS

| | | |
|---|---|---|
| JP | 8-35042 A | 2/1996 |
| JP | 8-277441 A | 10/1996 |
| JP | 9-157801 A | 6/1997 |
| JP | 2000-182640 A | 6/2000 |
| JP | 2003-197211 A | 7/2003 |
| JP | 2004-512651 A | 4/2004 |
| JP | 2005-320625 A | 11/2005 |
| JP | 2006-9056 A | 1/2006 |
| JP | 2011-174152 A | 9/2011 |
| JP | 2011/524844 A | 9/2011 |
| JP | 2014-31572 A | 2/2014 |
| WO | WO 02/35628 A1 | 5/2002 |
| WO | WO 02/38828 A1 | 5/2002 |
| WO | WO 2009-090419 A2 | 7/2009 |
| WO | WO 2012/144600 A1 | 10/2012 |
| WO | WO 2016/052623 A1 | 4/2016 |

OTHER PUBLICATIONS

Ebrahimifar et al., "Oxidation and electrical behavior of AISI 430 coated with cobalt spinels for SOFC interconnect applications," Surface and Coatings Technology, vol. 206, No. 1, Jun. 23, 2011, pp. 75-81, XP028261470.

Niewolak et al., "Potential suitability of ferritic and austenitic steels as interconnect materials for solid oxide fuel cells operating at 600° C.," Journal of Power Sources, vol. 195, No. 22, Nov. 15, 2010, pp. 7600-7608, XP027148088.

Yang et al., "Selection and Evaluation of Heat-Resistant Alloys for SOFC Interconnect Applications," Journal of the Electrochemical Society, vol. 150, No. 9, Jan. 1, 2003, p. A1188-A1201, XP055465185.

STAINLESS STEEL MATERIAL, CONSTITUTING COMPONENT, CELL, AND FUEL CELL STACK

TECHNICAL FIELD

The present invention relates to a stainless steel material, a constituting component, a cell, and a fuel cell stack. The fuel cell in this DESCRIPTION refers to a solid oxide fuel cell. The constituting component includes a separator (also referred to as "interconnector") and a cell core member.

BACKGROUND ART

A fuel cell is a cell which generates a direct current by making use of hydrogen and oxygen. The fuel cell is roughly classified into a solid oxide fuel cell, a molten carbonate fuel cell, a phosphoric acid fuel cell, or a solid polymer fuel cell. The type of each fuel cell is designated by the substance used for forming an electrolyte portion.

Of these fuel cells, fuel cells which can be commercially used currently are phosphoric acid fuel cells and molten carbonate fuel cells. The phosphoric acid fuel cells operate at near 200° C. The molten carbonate fuel cells operate at near 650° C. Recently, the solid polymer fuel cells which operate at near room temperature, and the solid oxide fuel cells which operate at 600° C. or above have been attracting attention as automobile-mounted power sources, and distributed power sources for business or home use.

The structural type of a solid oxide fuel cell includes a cylindrical type, a flat plate type, a flat plate cylindrical type and the like. The composition of electrolyte has been studied for lowering an operating temperature. For example, reports have been made as to operation at approximately 650° C. using a scandia-stabilized zirconia (SSZ)-based electrolyte and operation at approximately 450° C. using gadolinia-doped ceria (CGO)-based electrolyte.

Operating temperatures of these electrolytes are significantly low compared with approximately 1000° C. which is an operating temperature of conventional-zirconia-based electrolyte, for example, yttria-stabilized zirconia (YSZ). To distinguish solid oxide fuel cells from conventional fuel cells having an operating temperature of near 1000° C., such solid oxide fuel cells are referred to as "Intermediate Temperature Solid Oxide Fuel Cells" (abbreviated as IT-SOFCs).

To realize an operation at a lower temperature, attempts have been also made to reduce the thickness of electrolyte. As a forming method, various methods have been developed including a screen printing method, a tape-casting method, a vacuum slip casting method, an electrophoretic deposition method, a calendering method, a spray thermal decomposition method, and a sputtering and plasma spraying method.

In order to use a thin electrolyte film, a constituting component for a fuel cell which has required toughness is required. Specifically, a high alloy steel material or an austenitic stainless steel material is started to be used. Further, with the lowering of an operating temperature, ferritic stainless steel material is also started to be used which has a smaller difference in thermal expansion with respect to ceramic of an electrolyte portion.

A steel material used as a constituting component of a solid oxide fuel cell is required to have good oxidation resistance and good electrical conductivity (45 mΩ·cm$^2$ or less) for a long time in an operating temperature range and to have a thermal expansion coefficient (approximately $13 \times 10^{-6}$(1/K) at room temperature to 800° C.) substantially equal to a thermal expansion coefficient of ceramic-based solid oxide. In addition to the above, the steel material is required to have thermal fatigue resistance and anti-scale-peeling property for the case where starting and stopping are frequently repeated.

Various stainless steel materials have been used for forming constituting components for fuel cell.

For example, Patent Document 1 discloses a solid oxide fuel cell and a method for producing a solid oxide fuel cell where a metal substrate is used to enable a production of a ceramic electrolyte film by sintering, and a use of a brittle sealing material is unnecessary.

Patent Document 2 discloses a high temperature and intermediate temperature fuel cell particularly including a solid oxide fuel cell (SOFC), and a deposition method of a ceramic film on the surface of ceramic or metal, the method being effective for producing metal support type intermediate temperature SOFC which operates within a range from 450 to 650° C. Patent Document 2 particularly discloses a deposition method of a ceramic film having a sub-micron thickness including a film formed of stabilized zirconia, such as cerium gadolinium oxide (CGO), and doped ceria.

Patent Documents 3 and 4 disclose metal materials which have thermal expansion coefficients similar to the thermal expansion coefficient of stabilized zirconia used as a material for a solid electrolyte separator of a solid electrolyte fuel cell, thus having excellent heat resistance against an extremely high temperature, and having excellent corrosion resistance.

Patent Document 5 discloses inexpensive steel for a solid electrolyte fuel cell separator which forms an oxide coating film having good electrical conductivity at near 1000° C., and which has good oxidation resistance, particularly anti-peeling property, even in a long-time use, and which has a small difference in thermal expansion with respect to electrolyte.

Patent Document 6 discloses steel for a solid oxide fuel cell separator which forms an oxide coating film having good electrical conductivity at approximately 750 to 1000° C., and which stably has good oxidation resistance and anti-oxide-film-peeling property even in a long-time heating.

Patent Document 7 discloses a vehicle-mounted fuel cell including a separator which simultaneously satisfies conditions indispensable for practical use, that is, a separator which has high current collecting performance and long-term stability, has a light weight, and can be produced at a low cost.

Patent Document 8 discloses an austenitic stainless steel for a solid electrolyte fuel cell which has excellent oxidation resistance and electrical conductivity even in a high temperature oxidation atmosphere of 600° C. or above.

Patent Document 9 discloses ferritic stainless steel to which no rare earth metal is added, the ferritic stainless steel having excellent oxidation resistance at a high temperature, thus being suitable for application where high temperature oxidation resistance is required, particularly, for application as a current collecting member of a solid oxide fuel cell.

Patent Document 10 discloses a ferritic stainless steel plate suitable for a separator and high temperature members used around the separator of a solid oxide fuel cell, the ferritic stainless steel plate forming an oxide coating film having good electrical conductivity at a high temperature, and also having excellent film adhesiveness even in a long-term use.

Patent Document 11 discloses ferritic stainless steel used for a separator of a solid oxide fuel cell, the ferritic stainless steel having high electrical conductivity in a temperature range from 600 to 800° C., and having excellent thermal fatigue property.

LIST OF PRIOR ART DOCUMENTS

Patent Document

Patent Document 1: JP2004-512651A
Patent Document 2: JP2011-524844A
Patent Document 3: JP8-35042A
Patent Document 4: JP8-277441A
Patent Document 5: JP9-157801A
Patent Document 6: JP2005-320625A
Patent Document 7: JP2000-182640A
Patent Document 8: JP6-264193A
Patent Document 9: JP2011-174152A
Patent Document 10: JP2014-31572A
Patent Document 11: JP2006-9056A

SUMMARY OF INVENTION

Technical Problem

An object of the present invention is to provide a stainless steel material having excellent oxidation resistance in an environment in a solid oxide fuel cell which is operated in a temperature range from 400 to 860° C., and having low electrical contact resistance (hereinafter referred to as "contact resistance"), and to provide a constituting component, a cell, and a fuel cell stack which use the stainless steel material.

Solution to Problem

The present invention has been made to solve the above-mentioned problem, and the following stainless steel material, constituting component, cell, and fuel cell stack are the gist of the present invention.

(1) A stainless steel material including: a base material made of ferritic stainless steel; a Cr oxide layer formed on a surface of the base material; and a spinel-type transition metal oxide layer formed on a surface of the Cr oxide layer, wherein
a chemical composition of the base material satisfies a following formula (i),
a thickness of the Cr oxide layer and a thickness of the spinel-type transition metal oxide layer satisfy a following formula (ii),
the base material contains precipitate including one or more kinds selected from
a $M_{23}C_6$-type Cr carbide,
a $M_2B$-type Cr boride,
a complex precipitate in which a $M_2B$-type Cr boride acts as a precipitation nucleus, and a $M_{23}C6$-type Cr carbide precipitates on a surface of the $M_2B$-type Cr boride, and
a complex precipitate in which a NbC carbide acts as a precipitation nucleus, and a $M_{23}C_6$-type Cr carbide precipitates on a surface of the NbC carbide, and
a part of the precipitates protrude from the surface of the Cr oxide layer:

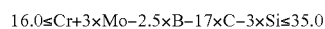  (i)

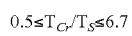  (ii)

where each symbol of an element in the formula (i) means content (mass %) of each element contained in the base material, and meaning of each symbol in the formula (ii) is as follows
$T_{Cr}$: thickness of Cr oxide layer
$T_S$: thickness of spinel-type transition metal oxide layer.

(2) The stainless steel material described in the above-mentioned (1), wherein the chemical composition of the base material consists of, by mass %:
C: more than 0.02% and 0.15% or less;
Si: 0.15 to 0.8%;
Al: 0.001 to 0.025%;
Mn: 0.01 to 1.0%;
P: 0.045% or less;
S: 0.010% or less;
N: 0.05% or less;
V: 0.5% or less;
Cr: 17.0 to 32.5%;
Mo: 0 to 4.5%;
Ni: 0 to 2.5%;
Cu: 0 to 0.8%;
W: 0 to 4.0%;
Co: 0 to 4.0%;
Ti: 0 to 6.5×C %;
Nb: 0 to 6.5×C %;
Sn: 0 to 0.05%;
In: 0 to 0.05%;
Sb: 0 to 0.01%;
Ca: 0 to 0.10%;
Mg: 0 to 0.10%;
REM: 0 to 0.10%;
B: 0 to 1.0%; and
the balance: Fe and impurity.

(3) A constituting component for a solid oxide fuel cell including the stainless steel material described in the above-mentioned (1) or (2).

(4) A cell for a solid oxide fuel cell including the constituting component for a solid oxide fuel cell described in the above-mentioned (3).

(5) A solid oxide fuel cell stack including the cell for a solid oxide fuel cell described in the above-mentioned (4).

Advantageous Effects of Invention

According to the present invention, it is possible to acquire a stainless steel material suitable for a solid oxide fuel cell, and a constituting component, a cell, and a fuel cell stack which use the stainless steel material.

DESCRIPTION OF EMBODIMENTS

Inventors of the present invention have been dedicated to the development of a stainless steel material suitably used for a constituting component of a solid oxide fuel cell. As a result, the inventors of the present invention have reached the following findings.

Reducing production costs of solid oxide fuel cells is an urgent task. Particularly, reduction in cost of stainless steel materials used for fuel cell bodies is a major task.

A stainless steel material used for a solid oxide fuel cell will be used under a high temperature oxidation environment over several tens of thousands of hours and consequently covered with a thick oxide layer. Accordingly, the stainless steel material to be used in a fuel cell is required to have excellent high temperature oxidation resistance characteristics. In addition to the above, the surface of the stainless steel material is required to have low contact resistance even in a state where the stainless steel material is covered with the oxide layer, thus having good conductivity.

An operating temperature of the solid oxide fuel cell depends on a temperature at which desired performance can be acquired with the solid oxide to be used. For example, the operating temperature of a high temperature solid oxide fuel cell is near 1000° C., and the operating temperature of an intermediate temperature solid oxide fuel cell falls within a temperature range of 850° C. or below. Recently, the operating temperature of an intermediate temperature solid oxide fuel cell is significantly lowered. The operating temperature is started to be lowered to 450 to 600° C., and further to approximately 430 to 550° C.

With a significant lowering of an operating temperature of an intermediate temperature solid oxide fuel cell, the choice of materials which can be used in the fuel cell is increased. In place of expensive Ni-based alloys, or austenitic stainless steel with high Ni content which have been conventionally used, more inexpensive ferritic stainless steel is started to be used as a base material. Ferritic stainless steel does not contain the large amount of Ni so that ferritic stainless steel is inexpensive, and a variation in price of the ferritic stainless steel is small.

Further, ferritic stainless steel has a small difference in thermal expansion with respect to solid oxide, which is ceramic. Accordingly, using ferritic stainless steel as a constituting component can suppress the generation of cracks at the solid oxide portion caused by a difference in thermal expansion which may be generated between the solid oxide portion and metal when the temperature is increased and decreased.

Even in the case where an operating temperature is low, that is, near 400° C., it is difficult to completely prevent the growth of an oxide layer. An increase (growth) in thickness of the oxide layer becomes a major cause of a decrease in conductivity. Particularly, the oxide layer has relatively good conductivity in a high temperature environment. However, conductivity is significantly decreased in a low temperature environment. Accordingly, with the lowering of an operating temperature, a problem of a decrease in conductivity caused by an oxide layer has become obvious.

A spinel-type transition metal oxide (hereinafter, also simply referred to as "spinel oxide") of oxides has relatively excellent conductivity. Accordingly, from a viewpoint of ensuring excellent conductivity, it is desirable that an oxide layer to be formed on the surface of the base material be a spinel oxide layer. In other words, it is desirable that an alloy for a base material be designed while taking into account an atmosphere environment to which the base material is to be exposed so that an oxide layer to be formed in a solid oxide fuel cell during operation is an oxide layer mainly formed of a spinel oxide.

However, environments in the solid oxide fuel cells differ from each other between individual fuel cells, and the fuel cell is not operated in fixed conditions. Under such circumstances, it is required to control an oxide layer to be formed of a spinel oxide, and is also required to stably maintain the spinel oxide in the form of a spinel oxide layer for a long time.

Accordingly, it is desirable that a Cr oxide layer be present between the base material made of a stainless steel material and the spinel oxide layer. Cr oxide has lower conductivity than a spinel oxide. However, a diffusion rate of oxygen and metal ion contained in the Cr oxide is lower than that in the spinel oxide. Therefore, growth of a Cr oxide layer can be suppressed even at a high temperature so that the Cr oxide layer is stably present.

Further, to cause the Cr oxide layer to be present between the base material and the spinel oxide layer allows a spinel oxide to be stably maintained. In other words, in terms of suppressing the growth of the oxide layer, and ensuring conductivity, it is necessary to laminate the Cr oxide layer and the spinel oxide layer in order on the surface of the base material, and to adjust a ratio between the thickness of the Cr oxide layer and the thickness of the spinel oxide layer.

To form an oxide layer including the Cr oxide layer and the spinel oxide layer on the surface of the base material, it is desirable to perform pre-oxidizing treatment in predetermined conditions before the base material is used in a solid oxide fuel cell.

Metal element diffusion from the steel material toward solid oxide easily progresses at a contact portion between a stainless steel material and the solid oxide. Metal element diffusion toward the solid oxide decreases power generation performance of the solid oxide. However, a stable oxide layer including the above-mentioned Cr oxide layer and spinel oxide layer functions as a barrier to diffusion of metal elements and hence, diffusion can be suppressed.

Power generation performance may be decreased due to sublimation of an oxide layer per se formed on the surface of a stainless steel material during operation of the solid oxide fuel cell, particularly, due to metal contamination of a solid oxide portion caused by sublimation of Cr oxide. Such a decrease in power generation performance becomes noticeable particularly in a temperature range of 800° C. or above. Accordingly, sublimation of Cr oxide is suppressed by adjusting the amount of effective Cr described later.

Further, as described above, the Cr oxide layer has insufficient conductivity, thus becoming a cause of a decrease in conductivity in a low temperature environment. However, when precipitate having conductivity is dispersed in a base material, and a part of the precipitate is caused to protrude from the surface of the Cr oxide layer, the precipitate functions as a conductive path and hence, contact resistance can be reduced even in a state where the stainless steel material is covered by an oxide layer having a large thickness.

The present invention has been made under the above-mentioned findings. Hereinafter, requirements of the present invention will be described in detail.

The stainless steel material according to the present invention includes a base material made of ferritic stainless steel, a Cr oxide layer formed on a surface of the base material, and a spinel-type transition metal oxide layer formed on a surface of the Cr oxide layer.

1. Chemical Composition of Base Material

A base material is ferritic stainless steel, and the chemical composition of the base material satisfies the following formula (i):

$$16.0 \leq Cr + 3 \times Mo - 2.5 \times B - 17 \times C - 3 \times Si \leq 35.0 \qquad (i)$$

where each symbol of an element in the formula means content (mass %) of each element contained in the base material.

As described above, by dispersing precipitates having conductivity, such as $M_2B$-type Cr boride or $M_{23}C_6$-type Cr carbide, in the base material of the present invention, desired electrical contact resistance characteristics of the base material can be ensured. Forming these precipitates decreases the concentration of Cr which contributes to oxidation resistance in the parent phase. When the value of the middle side in the formula (i) (hereinafter, also referred to as "amount of effective Cr") is less than 16.0, it is difficult to maintain oxidation resistance.

On the other hand, when the amount of effective Cr exceeds 35.0, the effect of ensuring oxidation resistance is saturated, and the problems of increasing cost of steel materials and of sublimation of Cr oxide become noticeable. In addition to the above, hot rolling property and toughness at a normal temperature decrease and hence, mass-productivity is lowered. Accordingly, it is necessary to adjust the chemical composition such that the amount of effective Cr satisfies the formula (i). The amount of effective Cr is preferably 18.0 or more, and is more preferably 20.0 or more. Further, the amount of effective Cr is preferably 30.0 or less, and is more preferably 25.0 or less.

Further, it is preferable that the chemical composition of the above-mentioned base material consists of, by mass %, C: more than 0.02% and 0.15% or less, Si: 0.15 to 0.8%, Al: 0.001 to 0.025%, Mn: 0.01 to 1.0%, P: 0.045% or less, S: 0.010% or less, N: 0.05% or less, V: 0.5% or less, Cr: 17.0 to 32.5%, Mo: 0 to 4.5%, Ni: 0 to 2.5%, Cu: 0 to 0.8%, W: 0 to 4.0%, Co: 0 to 4.0%, Ti: 0 to 6.5×C %, Nb: 0 to 6.5×C %, Sn: 0 to 0.05%, In: 0 to 0.05%, Sb: 0 to 0.01%, Ca: 0 to 0.10%, Mg: 0 to 0.10%, REM: 0 to 0.10%, B: 0 to 1.0%, and the balance: Fe and impurity.

In this embodiment, "impurity" means a component which is mixed due to various causes, such as a melting raw material used in industrially producing the base material, additive element, scrap, and production steps, and which is allowed within a range of not adversely affecting the present invention.

The reasons for limiting contents of respective elements in the preferred chemical composition of the above-mentioned base material are as follows. In the description made hereinafter, symbol "%" for content refers to "mass %".

C: more than 0.02% and 0.15% or less

C is an element necessary for causing $M_{23}C_6$-type Cr carbide to precipitate, and for reducing contact resistance on the surface of a steel material. When C content is 0.02% or less, the amount of precipitation of $M_{23}C_6$-type Cr carbide cannot be sufficiently ensured so that contact resistance cannot be sufficiently reduced. On the other hand, when C content is excessively large, ease of production is significantly lowered. Accordingly, C content is set to more than 0.02% and 0.15% or less.

Si: 0.15 to 0.8%

Si is an element added to perform deoxidation at a stage of melting steel. When Si content is less than 0.15%, it is difficult to stably control deoxidation of steel. Even if deoxidation of steel can be stably controlled, mass-productivity decreases, and production cost is increased. On the other hand, when Si content exceeds 0.8%, a $SiO_2$ film is formed in the vicinity of an interface between the base material and an oxide layer. $SiO_2$ has low conductivity and hence, when a $SiO_2$ film forms continuous layers, contact resistance increases, thus causing cell characteristics to deteriorate. Accordingly, Si content is set to a value which falls within a range from 0.15 to 0.8%. Si content is preferably more than 0.15%, and is preferably 0.3% or less.

Al: 0.001 to 0.025%

In the same manner as Si, Al is an element added to perform deoxidation at a stage of melting steel. Further, Al forms an $Al_2O_3$ film, thus contributing to the enhancement of oxidation resistance. When Al content is less than 0.001%, effects as a deoxidation element cannot be stably obtained. On the other hand, when Al content exceeds 0.025%, an $Al_2O_3$ film is formed in the vicinity of an interface between the base material and the oxide layer, thus increasing contact resistance in the same manner as the $SiO_2$ film. Accordingly, Al content is set to a value which falls within a range from 0.001 to 0.025%. Al content is preferably 0.003% or more, and is preferably less than 0.015%.

Mn: 0.01 to 1.0%

Mn forms spinel oxide together with Fe and Cr. Spinel oxide containing Mn has higher conductivity than Cr oxide ($Cr_2O_3$), thus reducing contact resistance of the steel material. The spinel oxide containing Mn also has an effect of preventing sublimation of Cr oxide which causes solid oxide to deteriorate. Further, Mn has an action of immobilizing S in steel as Mn sulfide, thus having an effect of improving hot workability. On the other hand, the spinel oxide containing Mn has lower oxidation resistance than Cr oxide. Therefore, when Mn content is excessively large, oxidation resistance is lowered. Accordingly, Mn content is set to a value which falls within a range from 0.01 to 1.0%. Mn content is preferably 0.2% or more, and is preferably 0.9% or less.

P: 0.045% or less

P is a harmful impurity element in the same manner as S. When P content exceeds 0.045%, ease of production is decreased. Accordingly, P content is set to 0.045% or less. P content is preferably 0.035% or less, and is more preferably 0.030% or less.

S: 0.010% or less

S is an impurity which is extremely harmful to corrosion resistance and oxidation resistance. Accordingly, S content is set to 0.010% or less. Lower S content is more preferable. Most of S precipitates in steel in the form of sulfide or complex sulfide of Mn, Cr, Fe, or Ti, or in the form of a complex of oxide or nitride of Mn, Cr, Fe, or Ti and the above-mentioned sulfide corresponding to a coexistence element in steel and S content in steel. Further, S may form sulfide of REM (rare earth metal) which is contained when necessary.

In an environment as a separator in the solid oxide fuel cell, any of the above-mentioned sulfide-based precipitates acts as a starting point of accelerated oxidation progression, thus being harmful to maintaining of a thin oxide layer. Usually, S content in mass-produced steel is approximately more than 0.005% to 0.008%. However, to suppress the above-mentioned harmful influence, S content is preferably 0.003% or less, and is more preferably less than 0.001%. With current refining techniques, S content can be set to less than 0.001% at an industrial mass production level with only a slight increase in production cost.

N: 0.05% or less

N can be effectively used to control micro-structure of steel of the present invention in a state of being heated to a high temperature. N is used to adjust the crystal grain size of a final product. However, when N content exceeds 0.05%, ease of production is decreased so that workability of a material to be processed decreases. Accordingly, N content is set to 0.05% or less. N content is preferably 0.04% or less, and is more preferably 0.03% or less.

V: 0.5% or less

It is not necessary to cause V to be intentionally contained. However, V is contained as an impurity in Cr source which is used as a melting raw material used at the time of mass production. V content is set to 0.5% or less. V content is preferably 0.4% or less, and is more preferably 0.3% or less.

Cr: 17.0 to 32.5%

Cr forms spinel oxide together with Fe and Mn. Cr also forms a $Cr_2O_3$ layer. Accordingly, Cr is an element which has an action of enhancing oxidation resistance of the base metal. Further, as described above, by dispersing precipitates, such as $M_2B$-type Cr boride or $M_{23}C_6$-type Cr carbide, in the base material of the present invention, desired contact resistance characteristics of the base material can be ensured. Accordingly, it is necessary to set Cr content to a predetermined amount or more.

The stainless steel material used in the present invention may be used as a cell constituting component for a solid oxide fuel cell, thus being formed into an integral body with a solid oxide portion having conductivity. An operation temperature of the solid oxide fuel cell falls within a temperature range of 860° C. or below, preferably falls within a temperature range from 450 to 700° C., more preferably falls within a temperature range from more than 500° C. to 700° C., and further preferably falls within a temperature range from more than 500° C. to less than 600° C. The environment in the solid oxide fuel cell is an oxidizing atmosphere environment having moisture, and is an environment where high temperature oxidation easily progresses.

Accordingly, the stainless steel material according to the present invention is required to maintain excellent oxidation resistance and good conductivity in a state where the stainless steel material is in contact with a solid oxide portion for a long time. Cr oxide has excellent oxidation resistance in steam oxidizing atmosphere, and exhibits an effect of ensuring conductivity under the above-mentioned temperature range. From such a viewpoint, higher Cr content is more preferable. However, depending on a temperature, poisoning of a catalyst caused by sublimation of Cr oxide becomes a problem. Accordingly, Cr content is set to a value which falls within a range from 17.0 to 32.5%. Cr content is preferably 30.5% or less.

Mo: 0 to 4.5%

Mo has an effect of improving oxidation resistance with a smaller amount than Cr so that Mo may be contained when necessary. However, even if Mo of more than 4.5% is contained, the above-mentioned effect is saturated. Accordingly, Mo content is set to 4.5% or less. To obtain the above-mentioned advantageous effect, Mo content is preferably 0.2% or more.

Ni: 0 to 2.5%

Ni improves strength of steel by solid-solution strengthening, is effective in adjusting α, γ phase transformation behavior and phase balance at the time of solidification and in a high temperature range of 900° C. or above, and also has an effect of improving toughness. Accordingly, Ni may be contained when necessary. However, even if Ni of more than 2.5% is contained, the above-mentioned effect is saturated. Accordingly, Ni content is set to 2.5% or less. To obtain the above-mentioned advantageous effects, Ni content is preferably 0.01% or more.

Cu: 0 to 0.8%

Cu has an effect of improving corrosion resistance so that Cu may be contained when necessary. However, even if Cu of more than 0.8% is contained, the above-mentioned effect is saturated. Accordingly, Cu content is set to 0.8% or less. To obtain the above-mentioned advantageous effect, Cu content is preferably 0.01% or more.

In the stainless steel material used in the present invention, Cu is present in a dissolved state. Depending on heat treatment conditions, it is possible to cause Cu-based precipitate to precipitate. However, when Cu-based precipitate is caused to precipitate, the Cu-based precipitate becomes a starting point of accelerated oxidation in the cell, thus decreasing fuel cell performance and hence, Cu-based precipitate is harmful. It is preferable that Cu be present in a dissolved state.

W: 0 to 4.0%

Co: 0 to 4.0%

In the same manner as Ni, W and Co have an effect of improving strength of steel by solid-solution strengthening so that W and Co may be contained when necessary. Further, W and Co concentrate at the interface between an oxide layer and steel, thus having an effect of enhancing conductivity. However, even if either one of W content and Co content is set to more than 4.0%, the above-mentioned effect is saturated. Accordingly, each of W content and Co content is set to 4.0% or less. To obtain the above-mentioned advantageous effect, it is preferable that one or both of W: 0.1% or more and Co: 0.01% or more is contained.

Ti: 0 to 6.5×C %

Ti is an element for stabilizing C in steel so that Ti may be contained when necessary. Ti has large chemical bonding strength with C so that most of Ti precipitates in the form of TiC in molten steel. In the case where Ti content exceeds 6.5×C %, depending on C content in molten steel, the amount of residual dissolved Ti which is not used for forming TiC is large even after precipitation of TiC is completed. Accordingly, dissolved Ti reacts with dissolved C in cooling process and hence, there may be a case where the amount of C which precipitates in the form of $M_{23}C_6$-type Cr carbide reduces. For this reason, Ti content is set to 6.5×C % or less. To obtain the above-mentioned advantageous effect, Ti content is preferably 0.01% or more.

Nb: 0 to 6.5×C %

Nb is an element for partially stabilizing C in steel so that Nb may be contained when necessary. There is no possibility that Nb precipitates in molten steel, and most of Nb finely disperses and precipitates in steel in the form of Nb carbide in the cooling process performed after solidification is completed. Precipitated Nb carbide functions as the precipitation nucleus of $M_{23}C_6$-type Cr carbide which is formed at a lower temperature. When Nb content exceeds 6.5×C %, depending on the amount of C in steel, the amount of residual dissolved C reduces so that the amount of C which precipitates in the form of $M_{23}C_6$-type Cr carbide reduces. Accordingly, Nb content is set to 6.5×C % or less. To obtain the above-mentioned advantageous effect, Nb content is preferably 0.05% or more.

Sn: 0 to 0.05%

When Sn is contained in steel, a tin oxide layer is formed on the surface in the solid oxide fuel cell so that a surface-coating effect can be obtained and hence, growth of an oxide layer at a high temperature can be suppressed. Tin oxide also has conductivity in a high temperature range, thus improving conductivity of the base material. Accordingly, Sn may be contained when necessary. However, when Sn content is excessively large, ease of production is decreased. Accordingly, Sn content is set to 0.05% or less. To obtain the above-mentioned advantageous effect, Sn content is preferably 0.01% or more.

In: 0 to 0.05%

In is one of rare metals, and is an extremely expensive additive element. In has an effect of decreasing surface contact resistance in the same manner as Sn so that In may be contained when necessary. However, when In content is excessively large, ease of production is decreased. Accordingly, In content is set to 0.05% or less. To obtain the above-mentioned advantageous effect, In content is preferably 0.002% or more.

Sb: 0 to 0.01%

Sb increases high temperature strength, and enhances corrosion resistance so that Sb may be contained when necessary. However, when Sb content is excessively large, precipitation and segregation of Sb inhibit ease of production. Accordingly, Sb content is set to 0.01% or less. To obtain the above-mentioned advantageous effect, Sb content is preferably 0.001% or more.

Ca: 0 to 0.10%

Mg: 0 to 0.10%

Ca and Mg have an effect of improving hot workability so that Ca and Mg may be contained when necessary. However, excessively large contents of Ca and Mg induce a decrease in ease of production. Accordingly, each of Ca content and Mg content is set to 0.10% or less. To obtain the above-mentioned advantageous effect, it is preferable that one or both of Ca: 0.01% or more and Mg: 0.01% or more is contained.

REM: 0 to 0.10%

REM has an effect of improving oxidation resistance and ease of hot production so that REM may be contained when necessary. However, excessively large REM content leads to an increase in production cost and hence, REM content is set to 0.10% or less. To obtain the above-mentioned advantageous effect, REM content is preferably 0.005% or more. In the present invention, REM means 17 elements in total including Sc, Y and lanthanoid, and the content of REM means total content of these elements. From industrial viewpoint, REM is added in the form of misch metal.

B: 0 to 1.0%

B precipitates and disperses in the form of $M_2B$, thus improving conductivity, and playing a role as a precipitation nucleus for controlling precipitation of $M_{23}C_6$ so that B may be contained when necessary. However, when B content exceeds 1.0%, the amount of precipitation of $M_2B$ excessively increases so that mass-productivity is decreased. Accordingly, B content is set to 1.0% or less. B content is preferably 0.8% or less. To obtain the above-mentioned advantageous effect, it is preferable that B content is set to more than 0.0003%. Further, in the case where precipitation and dispersion of $M_2B$ are positively and effectively used, B content is preferably 0.3% or more.

2. Oxide Layer

A layer of Cr oxide ($Cr_2O_3$) and a layer of spinel oxide are laminated on the surface of a base material in order. Spinel oxide means oxide having the structure expressed by $XY_2O_4$. X in $XY_2O_4$ refers to Mn, Fe, Ni, Co or the like, and Y in $XY_2O_4$ refers to Fe, Cr, Al or the like. Spinel oxide may be $MnCr_2O_4$ or the like, for example.

As described above, spinel oxide has relatively excellent conductivity. Accordingly, if an oxide layer formed on the surface can be controlled to spinel oxide, excellent conductivity can be ensured. However, it is extremely difficult to control an oxide layer to be formed of spinel oxide, and to stably maintain the spinel oxide for a long time.

On the other hand, the diffusion rates of oxygen and metal ion contained in Cr oxide are lower than that in spinel oxide. Accordingly, even at a high temperature, growth of Cr oxide is suppressed and hence, Cr oxide is stably present. Further, when a Cr oxide layer is present between the base material and a spinel oxide layer, spinel oxide is also stably maintained.

That is, by laminating the Cr oxide layer and the spinel oxide layer in order on the surface of the base material, it is possible to obtain conductivity which is a characteristic that a steel material for a solid oxide fuel cell is required to possess, and excellent oxidation resistance required for maintaining the conductivity.

Further, to obtain both conductivity and oxidation resistance, the thickness of the Cr oxide layer and the thickness of the spinel oxide layer are required to satisfy the following formula (ii).

$$0.5 \leq T_{Cr}/T_S \leq 6.7 \qquad (ii)$$

wherein meaning of each symbol in the above-mentioned formula is as follows.

$T_{Cr}$: thickness of Cr oxide layer $T_S$: thickness of spinel-type transition metal oxide layer When the ratio of the thickness of the Cr oxide layer decreases so that the value of the middle side in the formula (ii) becomes less than 0.5, oxidation resistance cannot be sufficiently ensured. Accordingly, growth of the oxide layer cannot be suppressed so that a film thickness increases whereby it becomes difficult to maintain conductivity. On the other hand, when the ratio of the thickness of the spinel oxide layer decreases so that the value of the middle side in the formula (ii) exceeds 6.7, contact resistance of the oxide layer increases due to Cr oxide and hence, conductivity necessary for a steel material decreases. It is preferable that the value of the middle side in the formula (ii) be 3.0 or less.

The thickness of the oxide layer is not particularly limited. However, when the thickness of the Cr oxide layer is less than 0.2 µm, stability of the oxide layer decreases, and Fe oxide or the like is formed on the surface and hence, there is a possibility of a significant decrease in conductivity. On the other hand, when the thickness of the Cr oxide layer exceeds 2.0 µm, precipitate described later cannot easily protrude from the Cr oxide layer. Accordingly, the thickness of the Cr oxide layer is preferably 0.2 µm or more. The total thickness of the Cr oxide layer and the spinel oxide layer is not also particularly limited. However, the total thickness is preferably set to a value which falls within a range from 0.5 to 3.0 µm.

The thickness of the Cr oxide layer and the thickness of the spinel oxide layer are obtained by the following procedure. First, a specimen is cut out such that an arbitrary cross section parallel to the thickness direction of the stainless steel material forms an observation surface. Then, distribution of each element, such as Cr or oxygen, on the cross section of the oxide layer is analyzed using EPMA (Electron Probe Micro Analyzer), thus measuring each of the thickness of the Cr oxide layer and the thickness of the spinel oxide layer. A thickness is measured at three or more positions in an observation visual field of each specimen and at ten or more positions on the cross section of the visual field, and the average value of the measured values is used.

3. Precipitate in Base Material

A base material used in the present invention contains precipitate dispersing and precipitating in the base material. The above-mentioned precipitate includes one or more kinds selected from a $M_{23}C_6$-type Cr carbide (hereinafter, also simply referred to as "$M_{23}C_6$"), a $M_2B$-type Cr boride (hereinafter, also simply referred to as "$M_2B$"), a complex precipitate in which $M_2B$ acts as a precipitation nucleus, and a $M_{23}C_6$ precipitates on the surface of $M_2B$, and a complex precipitate in which NbC carbide (hereinafter also simply referred to as "NbC") acts as a precipitation nucleus, and $M_{23}C_6$ precipitates on the surface of NbC.

M in $M_{23}C_6$ is Cr, or Cr and Fe or the like. A part of C may be substituted for B. M in $M_2B$ is Cr, or Cr and Fe or the like. A part of B may be substituted for C.

A part of the above-mentioned precipitate protrude from the surface of the Cr oxide layer. Spinel oxide has excellent conductivity. Accordingly, when $M_{23}C_6$ or $M_2B$ protruding from the surface of the Cr oxide layer is brought into contact with at least the spinel oxide layer, $M_{23}C_6$ or $M_2B$ functions as a conductive path, thus reducing contact resistance. The above-mentioned precipitate has higher conductivity than spinel oxide. Accordingly, it is preferable that precipitate protrudes also from the spinel oxide layer.

When B is contained in the base material, B precipitates in the form of $M_2B$ due to eutectic reaction at a point of time when solidification is completed. Pulverizing $M_2B$ at the time of performing hot forging, hot rolling, and cold rolling allows $M_2B$ to be uniformly dispersed. The dispersion state can be controlled by changing rolling conditions. $M_2B$ has conductivity, and is extremely-large-sized metal precipitate even in a pulverized state. Accordingly, B can reduce contact resistance.

When the base material is held for a long time in a temperature range of approximately more than 920° C., depending on C content in the base material, $M_{23}C_6$ in the base material becomes unstable thermodynamically. Accordingly, there may be a case where a portion or the whole of $M_{23}C_6$ is thermally decomposed so that Cr and C are redissolved in matrix.

On the other hand, $M_2B$ is highly thermally stable. Irrespective of production history thereafter, $M_2B$ does not dissolve, dissipate, or reprecipitate. Accordingly, it is effective that $M_{23}C_6$ is reprecipitated after being dissolved while $M_2B$ pulverized and dispersed after precipitation is caused to act as a precipitation nucleus. When $M_{23}C_6$ is caused to reprecipitate on the surface of $M_2B$, a contact area of a conductive path increases and hence, contact resistance characteristics can be improved.

That is, when B is contained in the base material, $M_2B$ functions as the precipitation nucleus of $M_{23}C_6$ which reprecipitates and hence, contact resistance characteristics can be easily and stably maintained. Further, dissolving of $M_{23}C_6$ and reprecipitating of $M_{23}C_6$ are behaviors which occur reversibly. Accordingly, contact resistance characteristics can be easily maintained even in an environment in a solid oxide fuel cell where a temperature varies with operation including a starting operation and a stopping operation.

Further, even in a temperature range of 860° C. or below where $M_{23}C_6$ may be assumed substantially thermodynamically stable, $M_{23}C_6$ is more easily agglomerated and coarsened due to diffusion with a longer exposure time and a higher application temperature.

$M_{23}C_6$ which is agglomerated and coarsened has an effect of improving contact resistance characteristics in the same manner as $M_{23}C_6$ before being agglomerated and coarsened. In other words, even if agglomeration and coarsening of $M_{23}C_6$ progress during operation of the fuel cell, contact resistance characteristics of the surface are maintained. Contact resistance characteristics may be enhanced due to agglomeration and coarsening of $M_{23}C_6$.

Further, when Nb is contained in the base material, there is no possibility that Nb precipitates in molten steel, and most of Nb finely disperses and precipitates in steel in the form of NbC in cooling process performed after solidification is completed. Thereafter, residual dissolved C which is not stabilized by Nb reacts with Cr in steel with a decrease in temperature, thus precipitating in the form of $M_{23}C_6$. At this point of operation, NbC functions as the precipitation nucleus of $M_{23}C_6$.

As described above, a part of precipitated $M_{23}C_6$ may be thermally decomposed (dissolved), precipitated, and agglomerated and enlarged due to variations in temperature to which $M_{23}C_6$ is exposed. However, even in the case where $M_{23}C_6$ is reprecipitated or agglomerated, finely dispersed NbC functions as the precipitation nucleus of $M_{23}C_6$.

To avoid a decrease in oxidation resistance caused by intergranular corrosion, it is desirable that $M_{23}C_6$ is caused to precipitate in crystal grain. There may be a case where a part of $M_{23}C_6$ inevitably precipitates on a crystal grain boundary. A Cr depleted zone brought about by precipitation of $M_{23}C_6$ on a crystal grain boundary can be recovered by adopting appropriate heat treatment conditions after precipitation. The presence of a Cr depleted zone brought about by precipitation of $M_{23}C_6$ can be easily checked by a test method for evaluating intergranular corrosiveness, that is, by performing a test, such as "copper sulfate-sulfuric acid test" defined in JIS G 0575.

A protruding height, from the surface of steel, of the precipitate which protrudes from the surface of the Cr oxide layer, and the dispersion state of the precipitate are not particularly limited. However, when the surface of steel before an oxide layer is formed has a higher value of arithmetic average roughness Ra, which is defined in JIS B 0601, the precipitate protrudes from the Cr oxide layer more frequently after the oxide layer is formed, thus increasing a contact opportunity where the precipitate functions as a conductive path. Accordingly, a higher value of arithmetic average roughness Ra is preferable. Therefore, arithmetic average roughness Ra before an oxide layer is formed is preferably 0.25 to 3.0 μm, and is more preferably 0.85 to 3.0 μm.

4. Method for Producing Base Material

Production conditions of the base material made of ferritic stainless steel are not particularly limited. For example, the base material can be produced by performing a heat rolling step, an annealing step, a cold rolling step, and a final annealing step in order on steel having the above-mentioned chemical composition.

In the heat rolling step, it is preferable to adjust crystal grain size and to control precipitation of $M_{23}C_6$ by effectively making use of phase transformation of an α phase and a γ phase at a high temperature. Specifically, control is performed so as to cause the steel to have a duplex microstructure of α phase and γ phase in the course of rolling so that a crystal grain size and precipitate in crystal grain can be controlled.

Subsequently, it is desirable to perform treatment for roughening the surface of a steel material before an oxide layer is formed such that precipitate protrudes from the surface of a Cr oxide layer. A method for performing surface roughening treatment is not particularly limited. However, pickling (etching) treatment is highly suitable in terms of mass-productivity. Particularly, it is preferable to perform etching treatment where ferric chloride solution is sprayed. The spray etching treatment which uses ferric chloride solution with high concentration is broadly adopted as a method for performing etching treatment on stainless steel, and it is also possible to reuse treatment solution after use. In general, the spray etching treatment which uses ferric chloride solution with high concentration is performed as treatment for locally reducing a thickness after masking processing is performed, or as treatment for forming a through hole in many cases. However, in the present invention, the spray etching treatment is adopted as scarfing treatment for roughening a surface.

The spray etching treatment will be described in more detail. Ferric chloride solution to be used is acid solution with extremely high concentration. The concentration of ferric chloride solution is quantified in terms of Baume degree which is a reading measured by a Baume scale. Etching treatment which is performed for roughening a surface may be performed by immersing a steel material into ferric chloride solution in a stationary state or in a flowing state. However, it is desirable that surface roughening is performed by spray etching. This is because, in producing in an industrial scale, the spray etching can efficiently control an etching depth, an etching rate, and the degree of surface roughening with high accuracy. The spray etching treatment can be controlled by controlling a pressure of solution to be ejected from a nozzle, an amount of solution, a flow rate (linear flow rate) of solution on a surface of a material to be etched, an angle at which solution is to be sprayed, and a temperature of solution.

It is desirable that ferric chloride solution to be used has low copper ion concentration and low Ni concentration in the solution. However, using generally available industrial solution causes no problem. It is preferable that the concentration of ferric chloride solution to be used is 40 to 51° in terms of Baume degree. When the concentration of ferric chloride solution is less than 40°, there is a strong tendency of pitting corrosion and hence, such concentration is not appropriate for roughening a surface. On the other hand, when the concentration of ferric chloride solution exceeds 51°, an etching rate is significantly decreased so that a deterioration rate of the solution is increased.

It is preferable to set the concentration of ferric chloride solution to a value which falls within a range from 42 to 46° in terms of Baume degree. It is preferable to set the temperature of ferric chloride solution to a value which falls within a range from 20 to 60° C. When a temperature decreases, an etching rate decreases. On the other hand, when a temperature increases, etching rate increases. When a temperature is high, solution deterioration also progresses in a short time.

The degree of solution deterioration can be continuously and quantitatively evaluated by measuring a natural potential of a platinum plate immersed into ferric chloride solution. As a simple method for recovering capacity of the solution when the solution is deteriorated, new solution may be added, or all solution may be exchanged with new solution. Further, a chlorine gas may be blown into the ferric chloride solution.

Immediately after etching treatment by the ferric chloride solution is performed, the surface is forcibly washed with a large amount of clean water. Such an operation is performed to rinse away surface deposits (precipitates) which are formed from ferric chloride solution diluted with wash water. It is desirable to perform spray washing where a flow rate on the surface of a material to be processed can be increased. It is also desirable to also perform washing in combination where a stainless steel material is immersed into flowing water for a while even after spray washing is finished.

5. Method for Producing Stainless Steel Material

Pre-oxidizing treatment is performed on the above-mentioned base material in predetermined conditions to form an oxide layer so that it is possible to acquire the stainless steel material according to the present invention. At this point of operation, by controlling conditions for pre-oxidizing treatment, the thickness of the Cr oxide layer and the thickness of the spinel oxide layer can be adjusted to suitable ranges. Detailed description will be made hereinafter.

In performing pre-oxidizing treatment, it is preferable that a base material be charged into a furnace having an atmosphere where an oxygen partial pressure is controlled, the base material be heated to 750 to 900° C. at an average temperature rising rate of 5 to 20° C./min, and be held for 12 to 100 hours within such a temperature range and, thereafter, be cooled in the furnace. When an average temperature rising rate is less than 5° C./min, formation of a spinel oxide layer progresses in a low temperature range in the temperature rising process so that it becomes difficult to form an oxide layer having a predetermined ratio. On the other hand, when an average temperature rising rate exceeds 20° C./min, there is a possibility that a material is deformed due to growth stress caused by the formation of the oxide layer.

Further, also in the case where a heating holding temperature is less than 750° C., a Cr oxide layer is formed slowly and hence, it becomes difficult to form an oxide layer having a predetermined ratio. On the other hand, when a heating holding temperature exceeds 900° C., formation of an oxide layer, particularly a spinel oxide layer, is promoted so that it becomes difficult to form an oxide layer having a predetermined ratio. There is also a possibility that the formed carbide and boride are decomposed.

It is preferable to adjust the heating holding time according to a treatment temperature and the particle size of precipitate. Specifically, it is sufficient to decide the heating holding time by calculating the growth rate of an oxide layer from the parabolic rate constant of a Cr oxide layer such that a part of precipitate of conductive metal has a thickness of an oxide layer protruding from a Cr oxide layer. For example, in the case where a treatment temperature is 830° C., it is preferable to set the heating holding time to 20 to 75 hours. In the case where a treatment temperature is 860° C., it is preferable to set the heating holding time to 10 to 50 hours. In the case where a treatment temperature is 890° C., it is preferable to set the heating holding time to 2 to 15 hours. By performing treatment with the above-mentioned time, it is possible to form an oxide layer having a predetermined ratio with high reproducibility.

It is preferable to set an atmosphere during heat treatment to a low oxygen partial pressure. When oxygen partial pressure during pre-oxidizing treatment is high, the formation of a spinel oxide layer is promoted so that it becomes difficult to adjust the ratio between the thickness of the Cr oxide layer and the thickness of the spinel oxide layer to an appropriate range. Specifically, it is preferable to set an oxygen partial pressure to $5 \times 10^{-14}$ Pa or less.

Hereinafter, the present invention is more specifically described with reference to examples. However, the present invention is not limited to these examples.

EXAMPLE 1

Steels No. 1 to 41 having a weight of 75 kg and chemical compositions shown in Table 1 were melted in a vacuum furnace, and were made into round ingots where a maximum outer diameter at a top portion of the ingot is 220 mm.

TABLE 1

| Steel | Chemical composition (by mass %, the balance: Fe and impurities) | | | | | | | | | | | | |
|---|---|---|---|---|---|---|---|---|---|---|---|---|---|
| No. | C | Si | Al | Mn | P | S | N | V | Cr | Mo | Ni | Cu | REM |
| 1 | 0.085 | 0.15 | 0.013 | 0.22 | 0.021 | 0.0008 | 0.0340 | 0.02 | 16.8 | — | — | 0.01 | — |
| 2 | 0.085 | 0.15 | 0.013 | 0.22 | 0.021 | 0.0008 | 0.0340 | 0.02 | 16.8 | — | — | 0.01 | — |

TABLE 1-continued

| | | | | | | | | | | | | | |
|---|---|---|---|---|---|---|---|---|---|---|---|---|---|
| 3 | 0.086 | 0.16 | 0.012 | 0.23 | 0.021 | 0.0012 | 0.0360 | 0.03 | 18.2 | — | 0.50 | — | — |
| 4 | 0.087 | 0.15 | 0.012 | 0.24 | 0.023 | 0.0009 | 0.0320 | 0.03 | 20.1 | — | 0.60 | — | — |
| 5 | 0.087 | 0.15 | 0.012 | 0.24 | 0.023 | 0.0009 | 0.0320 | 0.03 | 22.1 | — | 0.60 | — | — |
| 6 | 0.087 | 0.15 | 0.012 | 0.24 | 0.023 | 0.0009 | 0.0320 | 0.03 | 22.1 | — | 0.05 | — | — |
| 7 | 0.087 | 0.15 | 0.012 | 0.24 | 0.023 | 0.0009 | 0.0320 | 0.03 | 22.1 | — | — | — | — |
| 8 | 0.085 | 0.15 | 0.013 | 0.23 | 0.021 | 0.0007 | 0.0330 | 0.02 | 26.1 | — | 2.20 | — | — |
| 9 | 0.086 | 0.16 | 0.011 | 0.25 | 0.022 | 0.0011 | 0.0320 | 0.03 | 30.2 | — | 2.10 | 0.02 | — |
| 10 | 0.087 | 0.15 | 0.018 | 0.23 | 0.018 | 0.0009 | 0.0058 | 0.08 | 18.8 | — | 0.50 | 0.05 | — |
| 11 | 0.086 | 0.16 | 0.019 | 0.21 | 0.017 | 0.0007 | 0.0061 | 0.08 | 20.2 | — | 0.50 | 0.04 | — |
| 12 | 0.088 | 0.15 | 0.019 | 0.22 | 0.017 | 0.0010 | 0.0063 | 0.08 | 21.8 | — | 2.20 | 0.02 | — |
| 13 | 0.088 | 0.15 | 0.019 | 0.22 | 0.017 | 0.0010 | 0.0063 | 0.08 | 26.3 | — | 2.20 | 0.02 | — |
| 14 | 0.087 | 0.16 | 0.018 | 0.23 | 0.018 | 0.0012 | 0.0062 | 0.09 | 30.2 | — | 2.10 | 0.03 | — |
| 15 | 0.087 | 0.16 | 0.020 | 0.22 | 0.018 | 0.0010 | 0.0061 | 0.09 | 32.2 | — | 2.00 | 0.04 | — |
| 16 | 0.087 | 0.16 | 0.020 | 0.22 | 0.018 | 0.0010 | 0.0061 | 0.09 | 21.9 | — | 2.00 | 0.04 | — |
| 17 | 0.087 | 0.20 | 0.020 | 0.22 | 0.018 | 0.0010 | 0.0061 | 0.09 | 21.8 | — | 2.00 | 0.04 | — |
| 18 | 0.087 | 0.16 | 0.020 | 0.22 | 0.018 | 0.0010 | 0.0061 | 0.09 | 22.0 | — | 2.00 | 0.04 | 0.06 |
| 19 | 0.087 | 0.16 | 0.020 | 0.41 | 0.018 | 0.0010 | 0.0061 | 0.09 | 21.9 | — | 2.00 | 0.04 | 0.06 |
| 20 | 0.087 | 0.16 | 0.020 | 0.53 | 0.018 | 0.0010 | 0.0061 | 0.09 | 22.0 | — | 2.00 | 0.04 | 0.06 |
| 21 | 0.087 | 0.16 | 0.020 | 0.79 | 0.018 | 0.0010 | 0.0061 | 0.09 | 21.9 | — | 2.00 | 0.04 | 0.06 |
| 22 | 0.087 | 0.16 | 0.020 | 0.22 | 0.018 | 0.0010 | 0.0061 | 0.09 | 32.2 | — | 2.00 | 0.04 | — |
| 23 | 0.021 | 0.51 | 0.018 | 0.52 | 0.021 | 0.0008 | 0.0062 | 0.09 | 26.8 | — | 2.00 | 0.08 | — |
| 24 | 0.003 | 0.51 | 0.018 | 0.52 | 0.021 | 0.0008 | 0.0062 | 0.09 | 26.8 | — | 2.10 | 0.08 | — |
| 25 | 0.021 | 0.48 | 0.019 | 0.53 | 0.022 | 0.0009 | 0.0058 | 0.11 | 26.6 | — | 2.10 | 0.10 | — |
| 26 | 0.022 | 0.50 | 0.021 | 0.52 | 0.021 | 0.0008 | 0.0063 | 0.12 | 26.5 | — | 2.20 | 0.09 | — |
| 27 | 0.022 | 0.51 | 0.021 | 0.51 | 0.021 | 0.0008 | 0.0062 | 0.11 | 26.4 | — | 2.10 | 0.09 | — |
| 28 | 0.084 | 0.24 | 0.021 | 0.32 | 0.018 | 0.0009 | 0.0062 | 0.10 | 22.0 | — | 2.20 | 0.09 | 0.02 |
| 29 | 0.084 | 0.24 | 0.021 | 0.32 | 0.018 | 0.0009 | 0.0062 | 0.10 | 21.8 | — | 2.10 | 0.09 | 0.02 |
| 30 | 0.084 | 0.24 | 0.021 | 0.32 | 0.018 | 0.0009 | 0.0062 | 0.10 | 22.0 | — | 2.10 | 0.09 | 0.06 |
| 31 | 0.084 | 0.24 | 0.021 | 0.39 | 0.018 | 0.0009 | 0.0062 | 0.10 | 21.8 | — | 2.10 | 0.09 | 0.06 |
| 32 | 0.084 | 0.24 | 0.021 | 0.51 | 0.018 | 0.0009 | 0.0062 | 0.10 | 22.0 | — | 2.10 | 0.09 | 0.06 |
| 33 | 0.084 | 0.24 | 0.021 | 0.81 | 0.018 | 0.0009 | 0.0062 | 0.10 | 22.0 | — | 2.10 | 0.09 | 0.06 |
| 34 | 0.082 | 0.24 | 0.020 | 0.31 | 0.018 | 0.0008 | 0.0062 | 0.09 | 28.2 | — | 2.20 | 0.08 | 0.02 |
| 35 | 0.085 | 0.23 | 0.018 | 0.32 | 0.018 | 0.0009 | 0.0063 | 0.08 | 28.1 | — | 2.10 | 0.08 | 0.02 |
| 36 | 0.083 | 0.25 | 0.022 | 0.31 | 0.019 | 0.0010 | 0.0061 | 0.09 | 28.2 | — | 2.00 | 0.08 | 0.03 |
| 37 | 0.084 | 0.24 | 0.023 | 0.32 | 0.018 | 0.0009 | 0.0062 | 0.10 | 28.2 | — | 2.10 | 0.09 | 0.02 |
| 38 | 0.125 | 0.25 | 0.022 | 0.31 | 0.018 | 0.0009 | 0.0072 | 0.11 | 30.1 | 1.80 | 2.10 | 0.09 | 0.02 |
| 39 | 0.123 | 0.24 | 0.021 | 0.32 | 0.019 | 0.0008 | 0.0079 | 0.12 | 30.2 | 1.80 | 2.20 | 0.08 | 0.02 |
| 40 | 0.066 | 0.32 | 0.020 | 0.66 | 0.038 | 0.0018 | 0.0360 | 0.07 | 16.7 | — | 0.11 | 0.10 | — |
| 41 | 0.003 | 0.25 | 0.023 | 0.15 | 0.028 | 0.0020 | 0.0089 | 0.08 | 19.1 | 2.10 | 0.12 | 0.08 | — |

| Steel No. | Chemical composition (by mass %, the balance: Fe and impurities) | | | | | | | | | | Left side value of formula (i)† |
|---|---|---|---|---|---|---|---|---|---|---|---|
| | B | Nb | W | Co | Ti | Sb | Ca | Mg | Sn | In | |
| 1 | — | — | — | — | — | — | — | — | — | — | <u>14.9</u> |
| 2 | — | 0.24 | — | — | — | — | — | — | — | — | <u>14.9</u> |
| 3 | — | — | — | — | — | — | — | — | — | — | 16.3 |
| 4 | — | — | — | — | — | — | — | — | — | — | 18.2 |
| 5 | — | — | — | — | — | — | — | — | — | — | 20.2 |
| 6 | — | — | — | — | — | — | — | — | — | — | 20.2 |
| 7 | — | — | — | — | — | — | — | — | — | — | 20.2 |
| 8 | — | — | — | — | — | — | — | — | — | — | 24.2 |
| 9 | — | — | — | — | — | — | — | — | — | — | 28.3 |
| 10 | — | 0.02 | — | 0.02 | 0.01 | 0.01 | — | — | 0.02 | 0.01 | 16.9 |
| 11 | — | 0.02 | — | 0.02 | 0.01 | 0.01 | — | — | 0.02 | — | 18.3 |
| 12 | — | 0.02 | — | 0.02 | 0.01 | — | — | — | 0.02 | — | 19.9 |
| 13 | — | 0.02 | — | 0.02 | 0.01 | — | — | — | 0.02 | — | 24.4 |
| 14 | — | 0.02 | — | 0.02 | 0.01 | — | — | — | 0.02 | — | 28.2 |
| 15 | — | 0.02 | — | 0.02 | 0.01 | — | — | — | 0.02 | — | 30.2 |
| 16 | — | 0.02 | — | 0.02 | 0.01 | — | — | — | 0.02 | — | 19.9 |
| 17 | — | 0.02 | — | 0.02 | 0.01 | — | — | — | 0.02 | — | 19.7 |
| 18 | — | 0.02 | — | 0.02 | 0.01 | — | — | — | 0.02 | — | 20.0 |
| 19 | — | 0.02 | — | 0.02 | 0.01 | — | — | — | 0.02 | — | 19.9 |
| 20 | — | 0.02 | — | 0.02 | 0.01 | — | — | — | 0.02 | — | 20.0 |
| 21 | — | 0.02 | — | 0.02 | 0.01 | — | — | — | 0.02 | — | 19.9 |
| 22 | — | 0.27 | — | 0.02 | 0.13 | — | — | — | 0.02 | — | 30.2 |
| 23 | 0.62 | — | 0.19 | — | 0.01 | — | — | — | 0.02 | — | 23.4 |
| 24 | — | — | 0.19 | — | 0.01 | — | — | — | 0.02 | — | 25.2 |
| 25 | 0.61 | — | 0.22 | — | 0.01 | — | — | — | 0.02 | — | 23.3 |
| 26 | 0.61 | — | 0.21 | — | 0.01 | — | — | — | 0.02 | — | 23.1 |
| 27 | 0.62 | — | 0.21 | — | 0.01 | — | — | — | 0.02 | — | 22.9 |
| 28 | 0.62 | 0.08 | 0.23 | 0.06 | — | — | 0.03 | — | 0.01 | — | 18.3 |
| 29 | 0.62 | 0.08 | 0.23 | 0.06 | — | — | 0.03 | — | 0.01 | — | 18.1 |
| 30 | 0.62 | 0.08 | 0.23 | 0.06 | — | — | 0.03 | — | 0.01 | — | 18.3 |
| 31 | 0.62 | 0.08 | 0.23 | 0.06 | — | — | 0.03 | — | 0.01 | — | 18.1 |
| 32 | 0.62 | 0.08 | 0.23 | 0.06 | — | — | 0.03 | — | 0.01 | — | 18.3 |
| 33 | 0.62 | 0.08 | 0.23 | 0.06 | — | — | 0.03 | — | 0.01 | — | 18.3 |
| 34 | 0.62 | 0.08 | 0.21 | 0.05 | — | — | 0.03 | — | 0.01 | 0.01 | 24.5 |
| 35 | 0.61 | 0.07 | 0.22 | 0.06 | — | — | 0.03 | — | 0.02 | — | 24.5 |

TABLE 1-continued

| 36 | 0.62 | 0.08 | 0.21 | 0.05 | — | — | 0.03 | — | 0.01 | — | 24.5 |
| 37 | 0.62 | 0.08 | 0.23 | 0.06 | — | — | 0.03 | — | 0.01 | — | 24.5 |
| 38 | 0.61 | — | — | — | — | — | 0.03 | 0.02 | — | — | 31.1 |
| 39 | 0.62 | — | — | — | — | — | 0.03 | 0.03 | — | — | 32.2 |
| 40 | — | — | — | — | — | — | — | — | — | — | <u>14.6</u> |
| 41 | — | 0.25 | — | — | 0.12 | — | — | — | — | — | 24.6 |

The surface of ingot casting was removed by machining, was heated in a city gas burner combustion heating furnace heated to 1220° C., and was held for 2 hours. Thereafter, the ingot was forged into hot rolling slab having a thickness of 35 mm and a width of 160 mm with a temperature of the surface of the ingot falling within a temperature range from 1180° C. to 870° C., and the slab was allowed to cool. A cast piece having a thickness of 30 mm, a width of 150 mm, and a length of 200 mm was prepared by cutting out from the forged slab using a saw and by cutting the surface, thus forming a hot rolling cast piece.

The hot rolling cast piece was heated in an electric furnace set to 1220° C., and hot rolling and cooling were performed with seven passes. Total rolling reduction in a temperature range of more than 1050° C. was set to a fixed value of 55%. Further, a final pass was started at a point of time when temperatures of the surfaces of the cast pieces of all steels reached 900° C.

Immediately after hot rolling was finished, each steel material was cooled using a method which simulates a cooling pattern of a heat rolling coil. Specifically, immediately after hot rolling was finished, the steel material was allowed to be gradually cooled for 16 hours by being sandwiched between "ISOWOOLs" (trade name of a high temperature heat insulator made by Isolite Insulating Products Co., Ltd.) which is a commercially available heat insulator. Thereafter, the steel material was cooled with air by removing ISOWOOLs. The thickness of ISOWOOL used is 30 mm.

Even after the steel material was allowed to cool for 16 hours, the temperature of the surface of the steel material was more than 500° C. before ISOWOOLs were removed. Accordingly, the temperature history of the steel material is substantially similar to a temperature history of a hot rolling coil of eight tons at the time of cooling in performing mass production. Any materials to be processed had no cracks in the course of hot rolling so that hot rolled steel materials had fine external appearances. The thickness of a hot rolling finished plate was set to a fixed value of 3 mm.

Further, after hot rolling was performed, the steel material was subjected to heat treatment where the steel material was held at 820° C. for 6 hours thus simulating box annealing. Thereafter, the steel material was gradually cooled until the temperature of the surface of the steel material reaches 300° C. or below by being sandwiched between ISOWOOLs. Thereafter, the steel material was forcibly cooled with air.

Oxide scale on the surface of the steel material was completely removed by mechanical processing and, thereafter, an intergranular corrosion test conforming to JIS G 0575 was performed. To evaluate only intergranular corrosiveness while corrosion on the whole surface of the base material is suppressed, an improved evaluation test was performed where a test temperature was lowered to 90° C. As a result, intergranular corrosion was not observed.

After hot rolling was performed, oxide scale on the surface was remove by performing shot blasting and, further, the steel material was immersed into nitric hydrofluoric acid solution which is heated to 60° C. and which contains 8% nitric acid+6% hydrofluoric acid so as to perform descaling treatment, thus preparing a material to be processed for cold rolling. Cold rolling was performed such that the thickness of a finishing plate was set to a fixed value of 0.8 mm. After rolling was finished, annealing treatment was performed where the steel material is held in a condition of 820° C.×3 minutes.

After annealing treatment was performed, oxide scale on the surface was removed by performing shot blasting and, further, the steel material was immersed into nitric hydrofluoric acid solution which is heated to 60° C. and which contains 8% nitric acid+6% hydrofluoric acid so as to perform descaling treatment, thus preparing a performance evaluation specimen. A plate material having the size of 80 mm×120 mm was cut out from the performance evaluation specimen by cutting and, thereafter, the surface of the plate material was polished by No. 600 wet emery paper. Further, the surface of the plate on each side was subjected to scarfing by 6 μm by spraying ferric chloride solution having a solution temperature of 30° C. and 43° Baume in terms of density standard concentration. Then, the plate was washed with water.

After the above-mentioned treatment was performed, arithmetic average roughness Ra of each specimen was measured in accordance with JIS B 0601. The results of measurement of Ra are shown in Table 2. Thereafter, pre-oxidizing treatment was further performed in conditions shown in Table 2 to form an oxide layer on the surface, thus forming a pre-oxidizing specimen.

TABLE 2

| | | Surface | Conditions for pre oxidizing treatment | | | |
|---|---|---|---|---|---|---|
| Test No. | Steel No. | roughness Ra (μm) | oxygen partial pressure (Pa) | Temperature rising rate (° C./min) | Heating holding temperature (° C.) | Heating holding time (h) |
| 1 | <u>1</u> | 1.8 | $5.0 \times 10^{-14}$ | 10 | 830 | 50 |
| 2 | <u>2</u> | 0.9 | $5.0 \times 10^{-14}$ | 10 | 830 | 50 |
| 3 | 3 | 2.7 | $5.0 \times 10^{-14}$ | 10 | 830 | 50 |
| 4 | 4 | 2.0 | $5.0 \times 10^{-14}$ | 10 | 830 | 50 |
| 5 | 5 | 1.9 | $5.0 \times 10^{-14}$ | 10 | 830 | 50 |
| 6 | 6 | 1.9 | $5.0 \times 10^{-14}$ | 10 | 830 | 50 |
| 7 | 7 | 1.8 | $5.0 \times 10^{-14}$ | 10 | 830 | 50 |
| 8 | 8 | 1.4 | $5.0 \times 10^{-14}$ | 10 | 830 | 50 |

TABLE 2-continued

| | | Surface | Conditions for pre oxidizing treatment | | | |
|---|---|---|---|---|---|---|
| Test No. | Steel No. | roughness Ra (μm) | oxygen partial pressure (Pa) | Temperature rising rate (° C./min) | Heating holding temperature (° C.) | Heating holding time (h) |
| 9 | 9 | 1.0 | $5.0 \times 10^{-14}$ | 10 | 830 | 50 |
| 10 | 10 | 3.0 | $5.0 \times 10^{-14}$ | 10 | 830 | 50 |
| 11 | 11 | 2.2 | $5.0 \times 10^{-14}$ | 10 | 830 | 50 |
| 12 | 12 | 1.9 | $5.0 \times 10^{-14}$ | 10 | 830 | 50 |
| 13 | 13 | 1.5 | $5.0 \times 10^{-14}$ | 10 | 830 | 50 |
| 14 | 14 | 1.1 | $5.0 \times 10^{-14}$ | 10 | 830 | 50 |
| 15 | 15 | 2.8 | $5.0 \times 10^{-14}$ | 10 | 830 | 50 |
| 16 | 16 | 1.9 | $5.0 \times 10^{-14}$ | 10 | 830 | 50 |
| 17 | 17 | 1.9 | $2.1 \times 10^{-14}$ | 10 | 830 | 50 |
| 18 | 18 | 1.9 | $5.0 \times 10^{-14}$ | 10 | 830 | 50 |
| 19 | 19 | 1.9 | $5.0 \times 10^{-14}$ | 10 | 830 | 50 |
| 20 | 20 | 1.9 | $5.0 \times 10^{-14}$ | 10 | 830 | 50 |
| 21 | 21 | 1.9 | $5.0 \times 10^{-14}$ | 10 | 830 | 50 |
| 22 | 22 | 2.6 | $5.0 \times 10^{-14}$ | 10 | 830 | 50 |
| 23 | 23 | 1.5 | $5.0 \times 10^{-14}$ | 10 | 830 | 50 |
| 24 | 24 | 0.9 | $5.0 \times 10^{-14}$ | 10 | 830 | 50 |
| 25 | 25 | 1.5 | $5.0 \times 10^{-14}$ | 10 | 830 | 50 |
| 26 | 26 | 1.5 | $5.0 \times 10^{-14}$ | 10 | 830 | 50 |
| 27 | 27 | 1.5 | $5.0 \times 10^{-14}$ | 10 | 830 | 50 |
| 28 | 28 | 1.9 | $5.0 \times 10^{-14}$ | 10 | 830 | 50 |
| 29 | 29 | 1.9 | $2.1 \times 10^{-14}$ | 10 | 830 | 50 |
| 30 | 30 | 1.9 | $5.0 \times 10^{-14}$ | 10 | 830 | 50 |
| 31 | 31 | 1.9 | $5.0 \times 10^{-14}$ | 10 | 830 | 50 |
| 32 | 32 | 1.9 | $5.0 \times 10^{-14}$ | 10 | 830 | 50 |
| 33 | 33 | 1.9 | $5.0 \times 10^{-14}$ | 10 | 830 | 50 |
| 34 | 34 | 1.6 | $5.0 \times 10^{-14}$ | 10 | 830 | 50 |
| 35 | 35 | 1.6 | $5.0 \times 10^{-14}$ | 10 | 830 | 50 |
| 36 | 36 | 1.7 | $5.0 \times 10^{-14}$ | 10 | 830 | 50 |
| 37 | 37 | 1.6 | $5.0 \times 10^{-14}$ | 10 | 830 | 50 |
| 38 | 38 | 2.2 | $5.0 \times 10^{-14}$ | 10 | 830 | 50 |
| 39 | 39 | 2.2 | $5.0 \times 10^{-14}$ | 10 | 830 | 50 |
| 40 | 40 | 1.8 | $5.0 \times 10^{-14}$ | 10 | 830 | 50 |
| 41 | 41 | 1.8 | $5.0 \times 10^{-14}$ | 10 | 830 | 50 |
| 42 | 20 | 2.0 | $5.0 \times 10^{-14}$ | 2 | 830 | 50 |
| 43 | 20 | 2.1 | $5.0 \times 10^{-14}$ | 10 | 700 | 50 |
| 44 | 20 | 1.9 | $5.0 \times 10^{-14}$ | 10 | 950 | 50 |
| 45 | 20 | 2.0 | $5.0 \times 10^{-14}$ | 10 | 830 | 10 |

The surface of the pre-oxidizing specimen was analyzed by an X-ray diffraction (XRD) (RINT-2500 made by Rigaku Corporation), and phases of carbide, boride, and nitride were identified. Next, the cross section of an oxide layer of the pre-oxidizing specimen was analyzed by Field emission (FE)-EPMA (JXA-8530F made by JEOL Ltd.). Distributions of alloying element, such as Cr and Mn, and oxygen, carbon, and boron were analyzed to measure the thickness of the Cr oxide layer and the thickness of the spinel oxide layer. Further, positions of carbide and boride were specified from the distributions of carbon and boron, and investigation was performed on whether or not a protruding position of precipitate is on the Cr oxide layer and in the spinel oxide layer, or is on the spinel oxide layer.

Subsequently, a performance evaluation test was performed using pre-oxidizing specimens.

An oxidation test was performed at 800° C. for 1000 hours using pre-oxidizing specimens such that one surface of each specimen was exposed to an atmosphere of 10% hydrogen+90% steam, and another surface of each specimen was exposed to an atmosphere of atmospheric air+3% steam. A change in mass between before and after the oxidation test was measured, and oxidation resistance of each specimen was evaluated by a mass increase per unit area obtained by adding both surfaces. In the case where the mass increase per unit area is 0.4 mg/cm$^2$ or less, it is determined that a specimen has excellent oxidation resistance.

Further, after the oxidation test was performed at 800° C. for 1000 hours and for 3000 hours using the pre-oxidizing specimens in an atmosphere where 3% steam was added to atmospheric air, the value of electrical contact resistance of each specimen was measured. Contact resistance was measured as follows. A Pt mesh having a square of 10 mm×10 mm was fixed to each of upper and lower sides of the specimen after the oxidation test was performed using LSCF paste (obtained by mixing binder into LSCF powder), and a Pt line for applying an electric current and a Pt line for measuring a voltage were joined to the Pt meshes on the upper and lower sides of the specimen. In such a state, contact resistance was measured using a four-terminal method. The specimen to which the Pt meshes were fixed was left in a furnace having a temperature of 800° C. for 1 hour. Then, a voltage in the case where an electric current of 0.8 A is applied was measured to acquire a contact resistance value. The measurement was performed three times for each specimen, and an average value of the measurements was assumed as a contact resistance value. In the present invention, when a contact resistance value is less than 40 mΩ·cm$^2$, it is determined that a specimen has excellent contact resistance characteristics.

These results are collectively shown in Table 3.

TABLE 3

| Test No. | Steel No. | Thickness of oxide layer (µm) $T_{Cr}$[#1] | $T_s$[#2] | Total | $T_{Cr}/T_s$ | Precipitate | Protruting position of precipitate[#3] | Oxidation resistance (mg/cm²) | Value of contact resistance (mΩ·cm²) after pre-treatment | after 1000 hours | after 3000 hours | |
|---|---|---|---|---|---|---|---|---|---|---|---|---|
| 1  | 1  | 1.1  | 2.5 | 3.6  | 0.4 | M$_{23}$C$_6$ | on Cr | 0.54 | 33 | 49 | 59 | Comparative |
| 2  | 2  | 1.0  | 2.4 | 3.4  | 0.4 | NbC | on Cr | 0.51 | 36 | 58 | 69 | example |
| 3  | 3  | 1.4  | 0.7 | 2.1  | 1.9 | M$_{23}$C$_6$ | on Sp | 0.32 | 27 | 28 | 32 | Inventive |
| 4  | 4  | 1.3  | 0.7 | 2.0  | 1.9 | M$_{23}$C$_6$ | on Sp | 0.30 | 25 | 26 | 28 | example |
| 5  | 5  | 1.3  | 0.7 | 2.0  | 1.9 | M$_{23}$C$_6$ | on Sp | 0.29 | 23 | 23 | 24 | |
| 6  | 6  | 1.2  | 0.6 | 1.8  | 1.9 | M$_{23}$C$_6$ | on Sp | 0.27 | 24 | 25 | 27 | |
| 7  | 7  | 1.3  | 0.7 | 2.1  | 1.9 | M$_{23}$C$_6$ | on Sp | 0.31 | 24 | 25 | 27 | |
| 8  | 8  | 1.4  | 0.6 | 2.0  | 2.3 | M$_{23}$C$_6$ | on Sp | 0.29 | 25 | 25 | 27 | |
| 9  | 9  | 1.3  | 0.5 | 1.8  | 2.3 | M$_{23}$C$_6$ | on Sp | 0.27 | 25 | 25 | 27 | |
| 10 | 10 | 1.3  | 0.7 | 21   | 1.9 | NbC M$_{23}$C$_6$ TiN | on Sp | 0.31 | 26 | 27 | 32 | |
| 11 | 11 | 1.3  | 0.7 | 2.0  | 1.9 | NbC M$_{23}$C$_6$ TiN | on Sp | 0.30 | 26 | 27 | 29 | |
| 12 | 12 | 1.2  | 0.6 | 1.8  | 1.9 | NbC M$_{23}$C$_6$ TiN | on Sp | 0.27 | 26 | 27 | 29 | |
| 13 | 13 | 1.2  | 0.5 | 1.8  | 2.3 | NbC M$_{23}$C$_6$ TiN | on Sp | 0.26 | 27 | 28 | 29 | |
| 14 | 14 | 1.2  | 0.5 | 1.7  | 2.3 | NbC M$_{23}$C$_6$ TiN | on Sp | 0.26 | 27 | 28 | 29 | |
| 15 | 15 | 1.1  | 0.5 | 1.5  | 2.3 | NbC M$_{23}$C$_6$ TiN | on Sp | 0.23 | 27 | 28 | 29 | |
| 16 | 16 | 1.3  | 0.7 | 2.0  | 1.9 | NbC M$_{23}$C$_6$ TiN | on Sp | 0.29 | 27 | 28 | 29 | |
| 17 | 17 | 0.6  | 1.4 | 2.1  | 0.4 | NbC M$_{23}$C$_6$ TiN | on Cr | 0.31 | 22 | 30 | 42 | Comp. ex. |
| 18 | 18 | 1.2  | 0.6 | 1.8  | 1.9 | NbC M$_{23}$C$_6$ TiN | on Sp | 0.27 | 26 | 27 | 31 | Inventive |
| 19 | 19 | 1.2  | 0.6 | 1.9  | 1.9 | NbC M$_{23}$C$_6$ TiN | on Sp | 0.28 | 26 | 27 | 31 | example |
| 20 | 20 | 1.3  | 0.7 | 1.9  | 1.9 | NbC M$_{23}$C$_6$ TiN | on Sp | 0.29 | 26 | 27 | 31 | |
| 21 | 21 | 0.8  | 1.2 | 2.0  | 0.7 | NbC M$_{23}$C$_6$ TiN | on Cr | 0.30 | 24 | 25 | 28 | |
| 22 | 22 | 1.0  | 0.5 | 1.5  | 1.9 | NbCTiN | on Sp | 0.23 | 36 | 44 | 58 | Comp. ex. |
| 23 | 23 | 1.2  | 0.6 | 1.8  | 1.9 | M$_2$B TiN | on Sp | 0.26 | 29 | 30 | 32 | Inv. Ex. |
| 24 | 24 | 1.0  | 0.8 | 1.8  | 1.2 | - | on Sp | 0.26 | 38 | 45 | 60 | Comp. ex. |
| 25 | 25 | 1.0  | 0.8 | 1.8  | 1.2 | M$_2$B TiN | on Sp | 0.26 | 29 | 30 | 32 | Inventive |
| 26 | 26 | 1.0  | 0.8 | 1.8  | 1.2 | M$_2$B TiN | on Sp | 0.27 | 28 | 29 | 32 | example |
| 27 | 27 | 1.0  | 0.8 | 1.8  | 1.2 | M$_2$B TiN | on Sp | 0.27 | 29 | 30 | 32 | |
| 28 | 28 | 1.2  | 0.7 | 1.9  | 1.9 | M$_2$B NbC M$_{23}$C$_6$ | on Sp | 0.28 | 20 | 21 | 24 | |
| 29 | 29 | 0.6  | 1.4 | 2.0  | 0.4 | M$_2$B NbC M$_{23}$C$_6$ | on Cr | 0.29 | 20 | 30 | 40 | Comp. ex. |
| 30 | 30 | 1.2  | 0.6 | 1.8  | 1.9 | M$_2$B NbC M$_{23}$C$_6$ | on Sp | 0.27 | 26 | 27 | 32 | Inventive |
| 31 | 31 | 1.2  | 0.6 | 1.8  | 1.9 | M$_2$B NbC M$_{23}$C$_6$ | on Sp | 0.27 | 26 | 27 | 32 | example |
| 32 | 32 | 1.2  | 0.7 | 1.9  | 1.9 | M$_2$B NbC M$_{23}$C$_6$ | on Sp | 0.28 | 26 | 27 | 32 | |
| 33 | 33 | 0.8  | 1.2 | 2.0  | 0.7 | M$_2$B NbC M$_{23}$C$_6$ | on Cr | 0.29 | 23 | 23 | 27 | |
| 34 | 34 | 1.1  | 0.6 | 1.7  | 1.9 | M$_2$B NbC M$_{23}$C$_6$ | on Sp | 0.26 | 22 | 22 | 24 | |
| 35 | 35 | 1.1  | 0.6 | 1.7  | 1.9 | M$_2$B NbC M$_{23}$C$_6$ | on Sp | 0.25 | 21 | 21 | 23 | |
| 36 | 36 | 1.1  | 0.6 | 1.7  | 1.9 | M$_2$B NbC M$_{23}$C$_6$ | on Sp | 0.25 | 21 | 21 | 23 | |
| 37 | 37 | 1.0  | 0.6 | 1.6  | 1.9 | M$_2$B NbC M$_{23}$C$_6$ | on Sp | 0.24 | 22 | 22 | 24 | |
| 38 | 38 | 0.9  | 0.5 | 1.4  | 1.9 | M$_2$B NbC M$_{23}$C$_6$ | on Sp | 0.21 | 20 | 20 | 22 | |
| 39 | 39 | 0.9  | 0.5 | 1.4  | 1.9 | M$_2$B NbC M$_{23}$C$_6$ | on Sp | 0.21 | 20 | 20 | 22 | |
| 40 | 40 | 0.4  | 3.3 | 3.6  | 0.1 | M$_{23}$C$_6$ | on Cr | 0.54 | 40 | 64 | 76 | Comparative |
| 41 | 41 | 1.0  | 1.0 | 2.0  | 1.0 | NbCTiN | on Cr | 0.30 | 38 | 53 | 64 | example |
| 42 | 20 | 0.8  | 3.5 | 4.3  | 0.2 | NbC M$_{23}$C$_6$ TiN | on Cr | 0.52 | 28 | 113 | 170 | |
| 43 | 20 | 0.05 | 0.3 | 0.4  | 0.2 | NbC M$_{23}$C$_6$ TiN | on Sp | 0.65 | 23 | 209 | 464 | |
| 44 | 20 | 2.0  | 8.0 | 10.0 | 0.3 | NbCTiN | on Cr | 0.15 | 155 | 247 | 294 | |
| 45 | 20 | 0.4  | 1.5 | 1.9  | 0.3 | NbC M$_{23}$C$_6$ TiN | on Sp | 0.62 | 31 | 170 | 247 | |

[#1] TCr: thickness of Cr oxide layer
[#2] Ts: thickness of spinel transition metal oxide layer
[#3] In the column of protruting position of precipitate, "on Cr" means precipitate protrudes from Cr oxide layer and in spinel oxide layer, and "on Sp" means precipitate protrudes from spinel oxide layer.

As a result of the oxidation resistance evaluation, in the test nos. 1, 2 and 40, the amount of effective Cr is less than 16.0% and hence, the mass increase per unit area is large so that the specimens have insufficient oxidation resistance. Further, with respect to a change in a contact resistance value, a contact resistance value was relatively small after the pre-oxidizing treatment was performed. However, a contact resistance value was increased with time. The reason may be that the protective formation and maintaining of Cr oxide was not sufficient in these test nos.

In the test nos. 22, 24 and 41, precipitate which disperses in the base material contained none of a M$_{23}$C$_6$, a M$_2$B, a M$_{23}$C$_6$ where a M$_2$B acts as a precipitation nucleus, or a M$_{23}$C$_6$ where a NbC acts as a precipitation nucleus. Accordingly, the specimens had high contact resistance values at a point of time when the pre-oxidizing treatment was finished, and the contact resistance values further increased with time.

The test nos. 17, 29 and 42 to 45 are examples where pre-oxidizing treatment conditions are not appropriate. Specifically, in the test nos. 17 and 29, an oxygen partial pressure was high so that the ratio of a spinel oxide layer was increased and hence, a contact resistance value was increased with time. In the test No. 42, a temperature rising rate was low so that the ratio of a spinel oxide layer was increased and hence, a contact resistance value was increased with time.

In the test No. 43, a heating holding temperature was low so that the ratio of spinel oxide layer was increased whereby a contact resistance value was increased with time. In the test No. 44, a heating holding temperature was high so that the ratio of spinel oxide layer was increased. Further, precipitate which disperses in a base material contains none of a M$_{23}$C$_6$, a M$_2$B, M$_{23}$C$_6$ where a M$_2$B acts as a precipitation nucleus, or a M$_{23}$C$_6$ where NbC acts as a precipitation nucleus. Accordingly, the specimens had a high contact resistance value at a point of time after pre-oxidizing treatment was finished, and the contact resistance value was further increased with time. Further, in the test No. 45, a heating holding time was short and hence, the ratio of a spinel oxide layer was increased, and a contact resistance value was increased with time.

On the other hand, in the test nos. 3 to 16, 18 to 21, 23, 25 to 28 and 30 to 39 which are example embodiments of the present invention, the specimens had good oxidation resistance, and contact resistance values of less than 40 mΩ·cm² were maintained.

INDUSTRIAL APPLICABILITY

According to the present invention, it is possible to acquire a stainless steel material having excellent oxidation resistance in an environment in a solid oxide fuel cell which is operated in a temperature range from 400 to 860° C., and having low electrical contact resistance, and it is possible to acquire a constituting component, a cell, and a fuel cell stack which use the stainless steel material.

The stainless steel material of the present invention neither contains an expensive additive element as an essential element nor requires special surface treatment for imparting conductivity. Further, collected steel material can be recycled as a scrap material for melting general stainless steel without performing any treatment.

The invention claimed is:

1. A stainless steel material comprising: a base material made of ferritic stainless steel; a Cr oxide layer formed on a surface of the base material; and a spinel-type transition metal oxide layer formed on a surface of the Cr oxide layer, wherein
a chemical composition of the base material satisfies a following formula (i),
a thickness of the Cr oxide layer and a thickness of the spinel-type transition metal oxide layer satisfy a following formula (ii),
the base material contains precipitate including a $M_{23}C_6$-type Cr carbide,
a part of the precipitate of the base material that contains precipitate protrudes from the surface of the Cr oxide layer:

$$16.0 \leq Cr + 3 \times Mo - 2.5 \times B - 17 \times C - 3 \times Si \leq 35.0 \quad (i)$$

$$0.5 \leq T_{Cr}/T_S \leq 6.7 \quad (ii)$$

where each symbol of an element in the formula (i) means content (mass %) of each element contained in the base material, and meaning of each symbol in the formula (ii) is as follows $T_{Cr}$: thickness of Cr oxide layer
$T_S$: thickness of spinel-type transition metal oxide layer,
wherein the chemical composition of the base material consists of, by mass %:
C: more than 0.02% and 0.15% or less;
Si: 0.15 to 0.8%;
Al: 0.001 to 0.025%;
Mn: 0.01 to 1.0%;
P: 0.045% or less;
S: 0.010% or less;
N: 0.05% or less;
V: 0.5% or less;
Cr: 17.0 to 32.5%;
Mo: 0 to 4.5%;
Ni: 0 to 2.5%;
Cu: 0.01 to 0.8%;
W: 0 to 4.0%;
Co: 0 to 4.0%;
Ti: 0 to 6.5×C %;
Nb: 0 to 6.5×C %;
Sn: 0 to 0.05%;
In: 0 to 0.05%;
Sb: 0 to 0.01%;
Ca: 0 to 0.10%;
Mg: 0 to 0.10%;
REM: 0 to 0.10%;
B: 0 to 1.0%; and
the balance: Fe and impurity.

2. A constituting component for a solid oxide fuel cell comprising the stainless steel material according to claim 1.

3. A cell for a solid oxide fuel cell comprising the constituting component for a solid oxide fuel cell according to claim 2.

4. A solid oxide fuel cell stack comprising the cell for a solid oxide fuel cell according to claim 3.

5. The stainless steel material according to claim 1, wherein the precipitate further includes a $M_2B$-type Cr boride.

6. The stainless steel material according to claim 1, wherein the precipitate further includes a complex precipitate in which a $M_2B$-type Cr boride acts as a precipitation nucleus, and a $M_{23}C_6$-type Cr carbide precipitates on a surface of the $M_2B$-type Cr boride.

7. The stainless steel material according to claim 1, wherein the precipitate further includes a complex precipitate in which a NbC carbide acts as a precipitation nucleus, and a $M_{23}C_6$-type Cr carbide precipitates on a surface of the NbC carbide.

* * * * *